May 9, 1933.     R. T. CLOUD     1,907,741
ELECTRIC AMPLIFIER
Filed June 9, 1930

Inventor
Raymond T. Cloud
By Luther Johns
Atty

Patented May 9, 1933

1,907,741

UNITED STATES PATENT OFFICE

RAYMOND T. CLOUD, OF CHICAGO, ILLINOIS, ASSIGNOR OF ONE-HALF TO EMANUEL M. ZELONY, OF NEW YORK, N. Y.

ELECTRIC AMPLIFIER

Application filed June 9, 1930. Serial No. 459,858.

This invention relates to systems for amplifying electric currents.

The chief object is to provide an audio-frequency amplifier of high efficiency. This includes freedom from substantial distortion and the requisite volume in the sound output. More specific objects are simplicity, the use of relatively low battery or other power voltages, a greater range of signal voltage excursions, including substantially wide excursions into the positive field, with means for shifting the operating point of the signal excursions to keep the range of these excursions within the substantially non-distortive field, together with other advantages as will more fully hereinafter appear or as will be readily appreciated by those skilled in the art.

Figure 1:
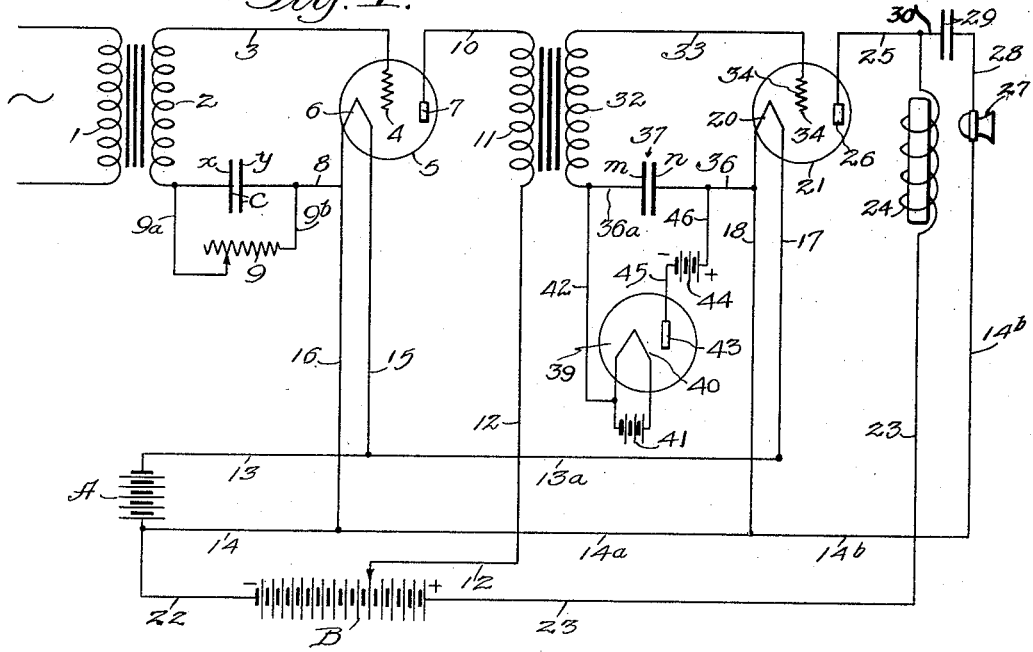
Figure 2:
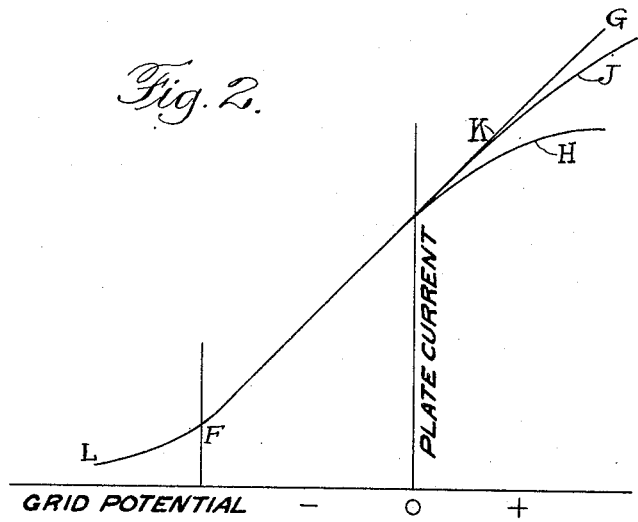

In the drawing Figure 1 represents, in the usual diagrammatic way, two stages of amplification each of which is according to the present invention. The circuit for the first stage shown will be used preferably in the earlier stages while that of the second stage illustrated will be preferred for the last stage or the later stages in amplifiers having say three stages or more; and Fig. 2 is a chart or graph representing voltage and current characteristics of a three-element amplifying tube.

The wiring diagram of Fig. 1 shows an audio-frequency transformer input primary 1 having an alternating signal current impressed thereon. One pole of its secondary 2 is connected by conductor 3 to the grid or control element 4 of the thermionic device or triode 5 which contains also the filament or electron-emitting cathode 6 and the plate or output terminal 7. The other pole of secondary 2 is electrically connected to filament 6 by means including the grid return conductor 8 in series with an electrostatic condenser C having plates $x$ and $y$, this condenser being bridged or shunted by a resistance 9 and its connections 9a and 9b.

The plate 7 is connected by conductor 10 to the output transformer primary 11 which is connected by conductor 12 to battery B at a point providing the desired voltage for the plate.

Battery A is connected by conductors 13 and 14 to the leads 15 and 16 respectively connected to filament 6, and the same battery conductors at 13a and 14a are shown as leading to conductors 17 and 18 respectively connected with filament 20 in the second stage tube or triode 21.

Battery B is connected at one end through conductor 22 to battery A or conductor 14, and at its other end through conductor 23 to choke coil 24 in communication through the conductor 25 to plate 26 of the second stage tube. Conductor 14b is connected to conductor 14a and leads to one terminal of loud-speaker 27 while conductor 28, condenser 29 and conductor 30 connect the other pole of the loud speaker with plate conductor 25.

The second-stage input transformer secondary 32 has one pole connected through conductor 33 to grid 34 of second-stage tube 21. A condenser 37 having plates $m$ and $n$ is in the grid return including conductor 36, and shunting this condenser 37 is a two-element valve device consisting of the filament 40 heated by battery 41 and connected through conductor 42 to the conductor marked 36a on one side of the condenser 37, being the side having plate $m$, this valve device comprising also a plate 43, the battery 44 having its negative side connected through conductor 45 to the plate 43 and having its positive side connected through conductor 46 to that part of the grid return marked 36 and being on the side of the condenser 37 having plate $n$.

It will be appreciated that instead of batteries a power unit may be employed to supply current for the filaments, etc. according to what is well-known in that respect.

I may point out, also, that the present invention discloses features novel in themselves in the input circuits only, so that those circuits are the only ones calling for particular description.

The theoretical characteristic curve of the well-known triode, with respect to grid potential versus plate current, contains a substantially large part which is on a substantially straight line on both sides of a point indicating zero grid potential. This line is marked F—G in Fig. 2. However, when the resistance of the ordinary audio-frequency transformer secondary is introduced into the input circuit, as at the place occupied by 2 or 32, the drop of potential through that secondary causes the curve on the positive side of the chart to deviate quite markedly from the substantially straight-line form, and is sufficiently illustrated by the line marked H. This deviation is proportionate to the ohmic resistance of such secondary, and on all but substantially small positive swings of the signal voltage the deviation is to such extent that pronounced distortion results.

In all practice heretofore, so far as I know, secondaries of high ohmic resistance have been used in the input circuits of such amplifying systems, usually with means for maintaining a negative bias on the grid to prevent the voltage excursions from entering the positive side of the curve, or if so to any extent, then but slightly.

One feature of the present invention is in the provision of a transformer secondary, as 2 or 32, of low ohmic resistance, while having the necessary high alternating-current impedance for a suitable input to such a thermionic device as a three-element tube. Owing to the relatively small potential drop through this low-ohmic secondary the excursions of the signal voltages may extend deeply into the positive side of the chart without appreciable distortion effects. The line J of Fig. 2 fairly indicates the distortion curve with a secondary of low ohmic resistance. I am thus able to utilize a much wider range of non-distortional excursions, as from F to K, than has hitherto, so far as I am aware, been found practicable.

The use of such a low resistance secondary would not alone, however, produce the desired result, primarily because on extreme excursions into the positive field the current flow on the grid circuit becomes so considerable that even the low ohmic resistance of the input secondary thus far found practicable in transformer constructions for such uses would not be sufficient to maintain the operations on that substantially straight line of the graph, as from F to K, necessary for non-distortional effects.

I therefore provide means, namely a condenser C, for limiting the positive excursions to such range thereof, as to the point K, as shows a substantially straight-like graph on the positive side of the chart.

The grid or control element as 4, when positive, attracts electrons from the cathode as 6. These negative ions accumulate on plate $x$ of condenser C, building up thereon a negative potential which causes the entire sine wave of the signal to shift downward, so that the operating point of the grid potential has moved to a lower position in the negative area according to the chart. The wave is not truncated or otherwise deformed at the top, but its base is bodily shifted to another operating position. As the flow of electrons to plate $x$ is proportional to the positive potential of the grid, the operating point representing the base of the sine wave of the signal is thus automatically shifted in the negative direction. This provision, then, limits the extremity of the upward or positive swing of the signal voltages.

In connection with limiting the extremities of the excursions another consideration arises. The downward shifting of the operating point might be so excessive under such conditions as where the point of operations is well downward on the negative side as to cause distortion at the lower or negative end portion of the curve, namely at the line F—L. I therefore provide means for limiting the extremity of the excursions downward in order to prevent this type of distortion. These means are shown in the first stage of amplification as a leakage path marked 9, 9a, 9b around the condenser, the element 9 being of substantially high ohmic resistance and being preferably adjustable in order readily to provide the best operating points according to the particular requirements. It will have a resistance value depending upon the amplitude of the signals, and may vary from say a million ohms to as low as say twenty-five thousand ohms. With a variable resistance constituting this leak it is a simple and easy matter to make the adjustment as required, since the function of this leak is to prevent the "blocking" of the tube on the deeply negative excursions. If blocking occurs the resistance at 9 will be decreased.

The ohmic resistance of the transformer secondary as 2 or 32 will preferably be the lowest compatible with such factors as size and weight of the transformer complete and the inherent difficulties in transformer construction with regard to distributed capacity, etc. I find a resistance of two hundred fifty ohms for such secondaries satisfactory and practical. In various embodiments this resistance will probably vary from say two hundred to five hundred ohms. Hitherto the secondaries of transformers for interstage coupling in audio-frequency transformers have ranged from about five thousand ohms to about ten thousand ohms. In this respect the invention therefore departs quite notably from prior practice.

In this connection I may point out that transformers having such low-resistance secondaries and suitable for audio-frequency amplifying circuits are not available in the general market, and that it would be impossible to obtain the desired results, according to these improvements, with the high secondary resistances indicated as being in common use. I may suggest, too, the advisability of forming these low-resistance transformers of the open net-work type, for example of the kind known as "pancake," with a view to the thereby reduced effects of distributed capacity.

As to the condensers marked C and 37, their capacity is not critical, so far as operation is concerned, although the value of this capacity has an effect upon the quality of the reproduction with respect to the proper balance between high and low frequencies. No specific value can be given for this capacity without knowledge of the frequency characteristics of the transformer used in a given embodiment, but in any event the selection of the most advantageous capacity value is merely a matter of ordinary engineering, once the principle is given. I have successfully employed condensers in these locations of from one-fourth of a microfarad to four microfarads.

With this further understanding of the system, it may be pointed out with respect to the condenser as C that since the electrons accumulating on plate $x$ counteract the tendency of the positive excursions to extend too far, the device is self-adjusting to a suitable operating point for the grid potential; and such adjustment takes place only when the same is needed, and to the necessary extent. This counteracting influence by the accumulated electrons occurs only on the positive swing, and it occurs automatically. Its effect is to move the point of operation or base of the signal sine wave farther into the negative field, and this occurs concurrently with a swing of the grid potential into the positive field. A signal of high amplitude may tend to throw the grid potential quite deeply into the positive field, but the excursion thereinto may go only a limited distance, although to a considerably greater distance than has heretofore been found feasible.

During operations the operating point of the up-and-down excursions is constantly changing, while remaining in the negative area. The negative countervailing potential varies with the signal and is effective wherever the operating point may be. The more rapid the accumulation of negative ions on condenser plate $x$ the more rapid will be the downward movement of the operating point. This has the effect of preventing any positive excursion from going beyond the point where appreciable distortion would begin, as at K in Fig. 2.

I have here, also, the application of negative ions to counteract the tendency of the grid or control element to become unduly positive. In other words, the control of the positive swing is by means of free ions as distinguished from some other kind of potential.

With respect to the leakage through the ohmic resistance 9 which is adapted to limit the downward swing, while leakage at this element is taking place at all times the device is in operation with a signal impressed on the grid, such leakage is more rapid (owing to the then higher potential) when the accumulation of ions on the condenser plate $x$ is relatively great. Such accumulation, as stated, moves the operating point to a lower position, but the ensuing rapid leakage tends to move the point of operation upward. The effect is that the operating point is moved downward until a balance of these opposing influences is reached, that point depending upon the amplitude of the signal at the time. The point of operation may move quite suddenly downward, but it will stop in this downward course far above the point F of Fig. 2, and this results from the adjustment of leak 9 which provides for such a rapid discharge under accumulated potential on plate $x$ as to hold the point of operation from moving too low.

This condenser and leak device is thus a regulator or control for both the positive and the negative excursions. As a unit it prevents these excursions from extending into the respective fields to a position where material or substantial distortion of the signal would occur.

The low ohmic resistance of the secondary as 2 extends the available range on the positive side. I have thus, according to this system, an unusually wide range for the substantially non-distortional effects desired.

Turning to the second stage in Fig. 1, the input circuit may be considered the same as in the first stage except for the valve 39, which, as illustrated, but without limitation, is a two-electrode tube known as a Fleming valve. It has a filament 40 and plate 43. I provide also a direct current negative voltage for the plate shown as a battery 44. In the later stages of amplification the signal amplitudes are relatively great. Such signals can be amplified properly according to the first stage, but in view of the larger amounts of power current involved in the later stages, with correspondingly greater fluctuations thereof, I consider it more satisfactory to withhold leakage of the electronic charge on plate $m$ of condenser 37 until it has reached some predetermined negative potential beyond which distortion on the negative side is likely to occur. This value is determined by battery 44, the negative terminal of which is connected to anode 43 of the unidirectional current device of which it forms a part.

Let us assume a negative potential of ten volts impressed by battery 44 on anode or plate 43. As is well known, no current will flow from battery 44 across the space between anode 43 and cathode 40. In such a device there is no current flow unless the anode 43 is positive to cathode 40. Now when the negative charge on condenser plate m exceeds the ten volts negative impressed on the anode the anode becomes positive to the cathode and an ionic discharge between cathode 40 and anode 43 takes place.

The valve device just described is a modified form of leak operating similarly to leak 9 but becoming effective only when the condenser charge exceeds a predetermined value.

The blocking battery 44 has no function or effect other than to determine the limit of accumulated potential on condenser 37. Its voltage never reaches the grid 34 or filament 20, and no current from battery 44 flows at any time through triode 21 or between any of its elements. In short, battery 44 has no current flow.

As in the first stage, this condenser and leak 37—39 is a device which controls both the positive and negative excursions of the grid potential and limits the extremities thereof to the substantially non-distortional range.

The voltages of battery B will vary for different stages, according to the tubes employed, etc., but will ordinarily be from twenty-five percent to fifty percent less than those usually employed in other types of amplifiers.

I contemplate as being included in the present invention all such changes, variations and departures from what is specifically illustrated and described herein as fall within the scope of the appended claims.

I claim:

1. In an audio-frequency amplifying system of the character described, an input circuit including the electron-emitting element and the control element of a thermionic triode, an input transfer secondary of materially low ohmic resistance included in said circuit, and means in series with one of said triode elements and said secondary for limiting the extremities of positive excursions of the control element potential.

2. In an audio-frequency amplifying system of the character described, an input circuit including the electron-emitting element and the control element of a thermionic triode, an input transformer secondary of materially low ohmic resistance included in said circuit, and means in series with one of said triode elements and said secondary for limiting the extremities of positive and negative excursions of the control element potential.

3. In an audio-frequency amplifying system of the character described, an input circuit including the electron-emitting element and the control element of a thermionic triode, an input transformer secondary having a resistance of less than one thousand ohms included in said circuit, and means in series with one of said triode elements and said secondary for limiting the positive excursions of the control element potential.

4. In an audio-frequency amplifying system of the character described, an input circuit including the electron-emitting element and the control element of a thermionic triode, an input transformer secondary having a resistance of less than five hundred ohms included in said circuit, and means in series with one of said triode elements and said secondary for limiting the positive excursions of the control element potential.

5. In an audio-frequency amplifying system of the character described, an input circuit including the electron-emitting element and the control element of a thermionic triode, an input transformer secondary having a resistance of less than three hundred ohms included in said circuit, and means in series with one of said triode elements and said secondary for limiting the positive excursions of the control element potential.

6. In an amplifying system of the character described, an input circuit including the electron-emitting element and the control element of a thermionic triode, an input transformer secondary having a resistance of less than one thousand ohms included in said circuit, and means in series with one of said triode elements and said secondary for limiting the extremities of the positive and negative excursions of control element potential.

7. In an audio-frequency amplifying system of the character described, an input circuit including the electron-emitting element and the control element of a thermionic triode and input transformer secondary included in said circuit, said secondary having an ohmic resistance so low as to provide for a materially great range of substantially non-distortional positive excursions of the control-element potential, and means for limiting such positive excursions substantially to such substantially non-distortional range.

8. In an audio-frequency amplifier, an input circuit including the electron-emitting cathode and the control element of a thermionic triode, an input transformer secondary included in said circuit and being of materially low ohmic resistance to provide a materially great range of substantially non-distortional positive excursions of the control-element potential, said circuit including means forming a path for signal voltages from one pole of the transformer secondary to said control element and means forming another path for such voltages from the other pole of said secondary to said cathode, one of said paths including an electrostatic condenser and a leak in shunt with said condenser.

9. In an audio-frequency amplifier, an input signal-amplifying circuit which includes a thermionic device having an electron-emitting element, a control element and an output element, and means in said circuit including an input transformer secondary of materially low ohmic resistance for providing a materially great substantially non-distortional range of positive excursions of the control element potential.

10. In an audio-frequency amplifier, an input signal-amplifying circuit which includes a thermionic device having a control element and an electron-emitting element, means external to the thermionic device and in said circuit for providing a substantially great range of positive excursions of the control element potential, and means for automatically limiting such positive excursions to substantially a non-distortional range.

11. In an audio-frequency amplifier, an input signal-amplifying circuit which includes a thermionic device having an electron-emitting element, a control element and an output element, said circuit including also an input transformer secondary of materially low ohmic resistance, and means for automatically shifting positively the point of operation of said control element potential during negative excursions respectively.

12. In an audio-frequency amplifier, an input signal-amplifying circuit which includes a thermionic device having an electron-emitting element, a control element and an output element, said circuit including also an input transformer secondary of materially low ohmic resistance, and means for alternately shifting in the positive and negative directions the point of operation of excursions of the control element potential to maintain the limits of the negative and positive excursions respectively within a substantially non-distortional range.

13. In an audio-frequency amplifier, an input signal-amplifying system which includes a thermionic device having an electron-emitting element, a cathode element and an output element, a transformer secondary of materially low ohmic resistance in said circuit and means for controlling an excursion of the control-element potential by shifting the point of operation of the control element potential in a direction opposite to the potential of the excursion.

14. In an audio-frequency amplifier, an input circuit which includes a thermionic device having grid, plate and cathode elements, a transformer input secondary of materially low ohmic resistance, and means for controlling the excursions of the signal potential of the grid element, said means comprising a capacity device in said circuit and a materially high resistance leak shunting said capacity device.

15. In an audio-frequency amplifier, an input signal-amplifying system employing a thermionic device having grid, plate and cathode elements, a transformer secondary of materially low ohmic resistance in said circuit, and means for controlling the excursions of the signal potential of the grid element, said means comprising a capacity device in said circuit and a unilateral current-conducting device in shunt with said capacity device together with means for automatically controlling the action of said current-conducting device.

16. In an audio-frequency amplifier, an input circuit including the control element and the electron-emitting element of a thermionic triode and including a materially low ohmic resistance source of signal oscillations, with means for controlling the excursions of the control element potential including an electrostatic condenser in series with said source and with one of said elements, a two-electrode tube serving as a one-way valve having cathode and anode and being in shunt with said condenser, and a source of direct-current potential in series with said anode and one side of said condenser, the potential of said current source serving to determine the potential at which said condenser will discharge between the cathode and the anode of said valve.

17. In an audio-frequency amplifier, an input circuit including the control element and the electron-emitting element of a thermionic triode and including a materially low ohmic resistance source of signal oscillations, with means producing a controllable ionic potential for automatically shifting the operating point of the control element potential in a direction opposite to the potential of the excursion.

18. In an audio-frequency amplifying system of the character described, an input circuit including the electron-emitting element and the control element of a thermionic triode, an input transformer secondary in said circuit and having an ohmic resistance so low as to provide for a materially great range of substantially non-distortional positive excursions of the control-element potential, with an electrostatic condenser in said circuit and between said electron-emitting element and said secondary, and a resistance leak shunting said condenser.

RAYMOND T. CLOUD.